US005344803A

United States Patent [19]

Menon et al.

[11] Patent Number: 5,344,803
[45] Date of Patent: Sep. 6, 1994

[54] COCATALYST FOR TRANSITION METAL-CONTAINING α-OLEFIN POLYMERIZATION CATALYST

[75] Inventors: Raghu Menon, West Chester; Albert P. Masino, Hamilton; Mark K. Reinking, Mason, all of Ohio

[73] Assignee: Quantum Chemical Corporation, Cincinnati, Ohio

[21] Appl. No.: 11,046

[22] Filed: Jan. 29, 1993

[51] Int. Cl.$^5$ ............................................. B01J 31/00
[52] U.S. Cl. .................................. 502/116; 502/113; 502/115; 502/119; 502/120
[58] Field of Search ............... 502/113, 115, 116, 119, 502/120

[56] References Cited

U.S. PATENT DOCUMENTS

| | | |
|---|---|---|
| 4,004,071 | 1/1977 | Aishima et al. |
| 4,250,287 | 2/1981 | Matlack. |
| 4,387,045 | 6/1983 | Sakurai et al. |
| 4,431,571 | 2/1984 | Karayannis. |
| 4,477,588 | 10/1984 | Hawley. |
| 4,530,913 | 7/1985 | Pullukat et al. |
| 4,806,433 | 2/1989 | Sasaki et al. |
| 4,886,021 | 9/1989 | Miro et al. .......................... 502/113 |
| 4,950,631 | 8/1990 | Buehler et al. |
| 4,983,694 | 1/1991 | Furtek. |
| 5,034,365 | 7/1991 | Buehler et al. |
| 5,051,388 | 9/1991 | Buehler et al. .......................... 502/113 |
| 5,104,949 | 4/1992 | Buehler et al. .......................... 502/113 |

*Primary Examiner*—Helane Myers
*Assistant Examiner*—E. D. Irzinski
*Attorney, Agent, or Firm*—William A. Heidrich

[57] ABSTRACT

The present invention is directed to a novel halosilane cocatalyst component which, when used in conjunction with an aluminum containing cocatalyst, is effective in increasing the activity of a supported magnesium/titanium containing catalyst in the polymerization of ethylene and α-olefins. In addition to the increased catalytic activity, the polymers produced by the present invention are characterized as having an unexpected enhancement in the polymer melt index. Thus, the catalyst system of the instant invention represents an advancement in the art in view of the combination of increased activity, i.e., yield of polymer produced, and physical properties of the polyolefin product.

In another aspect of the present invention, a process for polymerizing α-olefins is disclosed. In this process at least one olefin is polymerized under olefin polymerization conditions utilizing the catalyst system of the present invention, which includes the solid catalyst component of the present invention, along with the first cocatalyst, an aluminum-containing compound, and the second cocatalyst, a halosilane compound.

10 Claims, No Drawings

COCATALYST FOR TRANSITION METAL-CONTAINING α-OLEFIN POLYMERIZATION CATALYST

FIELD OF THE INVENTION

This instant invention relates to a novel cocatalyst component for Ziegler-Natta type catalyst systems useful in the polymerization of olefins. More specifically, the invention relates to a novel halosilane cocatalyst component which, when used in conjunction with an aluminum containing cocatalyst is effective in increasing the activity and improving the molecular weight control, as well as enhanced polymer performance of a silica-supported magnesium/titanium containing solid catalyst in the polymerization of ethylene.

BACKGROUND OF THE INVENTION

The use of Ziegler-Natta catalysts, which usually consists of compounds of Group IV-VIB metals and organometallic compounds of Groups I-IIIA of the Periodic Table of Elements, in the polymerization of olefins are widely utilized. These catalysts are known to effectively promote the polymerization of olefins in high yield possessing the desired characteristic of these polymers. However, the use of these conventional Ziegler-Natta catalyst systems are subjected to important failings. Thus, new and improved catalysts are continually being sought.

Commonly in the polymerization of α-olefins a catalyst system having a magnesium halide support is oftentimes utilized. Unfortunately, when polyolefins obtained by polymerization of alpha olefins using these catalysts are processed into molded articles, the molding apparatus processing this polymer is subjected to corrosion. This corrosion is caused by the presence of residual halide in the polymer product. More significantly, this adverse effect of corrosion is not limited to damaging just the molding apparatus. More importantly, the polymeric molded article processed by the corroded apparatus is often characterized as having undesirable aesthetic flaws.

One of the most important properties associated with a catalyst is its catalytic activity for a defined process. The activity of a catalyst is represented by the weight of product produced per unit weight of catalyst used. Accordingly, the activity of a polymerization catalyst is defined by the weight of the polymer produced per weight of catalyst. Those skilled in the art are aware that the effect of higher activity not only reduces the amount of catalyst required for the polymerization process but more importantly this translates into lower catalyst concentration in the final polymeric product. This lower concentration of catalyst in the polymeric product usually results in a higher purity product. Thus in the development and design of novel catalysts for polymerizing olefins, this property along with the effect of the catalyst on the physical properties of the polymer must be carefully considered.

One way of achieving a higher catalytic activity without negatively effecting the physical characteristics of the polymer is to introduce so-called cocatalysts or activators to the solid catalyst component during the polymerization process.

Typically, the solid catalyst component is contacted with an organoaluminum cocatalyst during the polymerization of the olefin in order to increase the amount of polymeric product.

U.S. Pat. No. 4,806,433 to Sasaki relates to a solid catalyst component containing a trivalent titanium compound, obtained by reducing a titanium compound represented by the general formula $Ti(OR^1)_n X_{4-n}$; wherein $R^1$ is a hydrocarbon group of 1 to 20 carbon atoms, X is a halogen atom, and n is a number satisfying $0 < n \leq 4$ with an organomagnesium compound in the presence of an alcohol compound and/or a phenol compound to obtain a solid product and then treating the solid product with a mixture of an ether compound and titanium tetrachloride. The reference also relates to a catalyst system comprised of: the solid catalyst component described above and an organoaluminum cocatalyst compound; and a process for producing an olefin polymer, which comprises homopolymerizing an olefin or copolymerizing olefins using said catalyst system.

U.S. Pat. No. 4,983,694 to Furtek relates to a process for polymerizing at least one α-olefin with a supported catalyst component prepared by contacting a solid, porous carrier having reactive OH groups with at least one liquid organomagnesium compound having the formula $R_n MgR^1_{(2-n)}$ where R and $R^1$ are the same or different $C_1$-$C_{12}$ hydrocarbyl group; evaporating said liquid to produce a supported-magnesium compound in the form of a dry, free-flowing powder; and reacting the powder with at least one transition metal compound. The solid catalyst obtained is then reacted with a suitable cocatalyst during polymerization. Suitable cocatalyst include compounds of Group IB, IIA, IIB, IIIB and IVB of the Periodic Table of Elements. The reference however does not disclose using halosilane compounds as a cocatalyst component.

U.S. Pat. No. 4,250,287 to Matlack relates to a solid catalyst component useful for polymerizing 1-olefins. The catalyst component is composed of a titanium halide deposited on an anhydrous magnesium halide support and an activator component composed of a trialkylaluminum and an alkyl ester of an aromatic carboxylic acid. The productivity of said catalyst is increased by including a halosilane in the activator component.

U.S. Pat. No. 4,950,631 to Buehler et al. discloses a catalyst comprising the product formed by (a) treating silica to remove surface hydroxyl groups;
(b) contacting said treated silica with (1) a modifying compound selected from the group consisting of silicon halides, boron halides, aluminum halides, alkyl silicon halides and mixtures thereof; and (2) at least one hydrocarbon soluble magnesium-containing compound selected from the group consisting of hydrocarbyloxy magnesium, hydrocarbyloxymagnesium halides and mixtures thereof; said contacting steps (1) and (2) occurring in random order; (c) contacting the product of step (b) with at least one titanium-containing compound having the structural formula $Ti(OR)_n X_m$, where R is aryl, alkyl or mixtures thereof; X is halogen; n is an integer of 1 to 4; m is 0 or an integer of 1 to 3; and the sum of m and n is 4; and (d) treating the product of step (c) with a titanium-containing compound having the structural formula $TiX^1_p OR^1_q$ where $X^1$ is halogen; $R^1$ is aryl or alkyl; p is an integer of 1 to 4; q is 0 or an integer of 1 to 3; and the sum of p and q is 4, with the proviso that the titanium-containing compound of this step is not the same as the titanium-containing compound of step (c).

The catalyst prepared by Buehler is useful in polymerizing propylene. In this application, propylene is polymerized under propylene polymerization conditions in the presence of a first co-catalyst, an aluminum-containing compound, and a second co-catalyst, a silane. Buehler et al. discloses using hydrocarbylalkoxysilanes as a cocatalyst component; however, the reference does not suggest that halosilane may be used instead of hydrocarbylalkoxysilanes.

Another way of increasing catalytic activity without affecting the physical properties of the resultant polymer is to add one or more so-called modifying compounds during preparation of the solid catalyst component. These modifying compounds are known to effectively alter the morphology of the catalytic surface. These modifying compounds are typically added during the initial stage of preparing the solid catalyst compound.

U.S. Pat. No. 4,387,045 to Sakurai et al. provides an olefin polymerization catalyst comprising a solid catalyst obtained by reacting an organomagnesium compound with a titanium or vanadium compound having at least one halogen atom. The solid catalyst is then reacted with an organometallic compound and an inorganic or organic aluminum, silicon, tin or antimony compound prior to the polymerization process. During polymerization, aluminum alkyl compounds are added to catalyst component as the sole co-catalyst system.

U.S. Pat. No. 4,431,571 to Karayannis discloses a comminuted, supported polymerization catalyst for alpha-olefins comprising an organoaluminum compound and a solid titanium-containing component formed by comminuting a solid reaction product comprising at least one halogen-containing compound of titanium (IV); at least one electron donor; and at least one hydrocarbon-insoluble, magnesium-containing compound; and retreating such comminuted product with at least one halogen-containing compound of titanium (IV); at least one haloalkyl-chlorosilane; and at least one organic acid ester. The solid catalyst component is then reacted with an organoaluminum cocatalyst during the polymerization of α-olefins.

U.S. Pat. No. 4,477,588 to Hawley relates to a catalyst which comprises the product obtained by reacting magnesium dihalide, 4-phenyl phenol, ethyl benzoate, and titanium tetra-n-butoxide. This solid product is then reacted with an organoaluminum halide comprising ethylaluminum sesquichloride followed by a mixture of halogen-containing mixture comprising titanium tetrachloride, trichlorosilane, and silicon tetrachloride. Hawley also discloses using the solid catalyst component described hereinabove in the polymerization of propylene by combining the catalyst with a triethylalumum cocatalyst.

U.S. Pat. No. 5,034,365 to Buehler et al. discloses a polymerization catalyst similar to that disclosed in patent '631 except that a second modifying compound having the structural formula $SiH_rX^2_s$, where $X^2$ is halogen; r is an integer of 1 to 3; and s is an integer of 1 to 3 with the proviso that the sum of r and s is 4, is added prior to the step of contacting the solid product with a first titanium-containing compound.

SUMMARY OF THE INVENTION

The present invention is directed to a novel halosilane cocatalyst component which, when used in conjunction with an aluminum containing cocatalyst, is effective in increasing the activity of a supported magnesium/titanium containing catalyst in the polymerization of α-olefins. In addition to the increased catalytic activity, the polymers produced by the present invention are characterized as having an unexpected enhancement in the polymer melt index. Thus, the catalyst system of the instant invention represents an advancement in the art in view of the combination of increased activity, i.e., yield of polymer produced, and physical properties of the polyolefin product.

In accordance with the present invention, a representative catalyst system is provided which comprises contacting a magnesium-containing compound or a magnesium-aluminum complex and at least one modifying compound. The sequence of contacting the inorganic oxide support with the magnesium-containing compound and the modifying compound is random. The modifying compound is selected from the group consisting of silicon halides, boron halides, aluminum halides, and mixtures thereof. The product of this contacting step is then contacted with a titanium-containing compound having the formula $TiX^1_p(OR^1)_q$ wherein $X^1$ is a halogen; $R^1$ is aryl, alkyl, cycloalkyl, aralkyl, alkylsilyl; p and q range from 0 to 4 with the proviso that the sum of p and q is 3 or 4.

The above-obtained solid catalyst component is then contacted with an aluminum-containing first cocatalyst and a halosilane second cocatalyst during olefin polymerization. The aluminum-containing cocatalyst compounds are conventional aluminum cocatalyst well known in the art, e.g. aluminum alkyls.

The novel cocatalyst component of the present invention is represented by the following structural formula $R_a^2SiX_b^2$ wherein $X^2$ is a halogen; $R^2$ is hydrogen, alkoxy, aryloxyl, alkyl, silyoxy, aryl, or cycloalkyl; a is an integer from 0 to 3; and b is an integer from 1 to 4 with the proviso that the su3n of a and b is 4.

In another aspect of the present invention, a process for polymerizing α-olefins is disclosed. In this process at least one olefin is polymerized under olefin polymerization conditions utilizing the catalyst system of the present invention, which includes the solid catalyst component of the present invention, along with the first cocatalyst, an aluminum-containing compound, and the second cocatalyst, a halosilane compound.

DETAILED DESCRIPTION OF THE INVENTION

The preferred solid catalyst component utilized in the present catalyst system is prepared by initially contacting silica with a magnesium compound or complex and at least one modifying compound.

The silica employed in the current catalyst system is preferably pure however, it may contain minor amounts of other inorganic oxides. In general, the silica support comprises at least 90%–99% by weight pure silica. In one preferred embodiment the silica is at least 99% pure.

The silica support utilized in the preparation of the catalyst, is preferably a high surface area, high pore volume material defined by a surface area between 50 m²/g and about 500 m²/gm; a median size of about 20 microns to about 200 microns and a pore volume of about 0.5 cc/gm to about 3.0 cc/gm as determined by standard B.E.T. measurements.

It is a preferred embodiment of the invention that the silica support be pretreated prior to its use to remove some impurities or surface hydroxyl groups.

To cause effective removal of surface hydroxyl groups from the surface of the silica support, the silica may be calcined in an inert atmosphere at a temperature of at least 150° C. Preferably, calcination of the silica is performed in the temperature range from about 150° C. to about 650° C. in an inert gas atmosphere, i.e. nitrogen or argon.

Another method of removing surface hydroxy groups involves contacting the silica with a hexaalkyl disilazane or chlorosilanes as disclosed in U.S. Pat. No. 4,530,913 of Pullukat et al., for example. Of the hexaalkyl disilazane useful in this application, hexamethyl disilazane is particularly preferred.

The silica may also be pretreated by combining the calcination method and treatment with a hexalkyl disilazane. In this method, the sequence of pretreatment may be random; however, it is another preferred embodiment that the hexaalkyl disilazane treatment precede the calcination process.

In a preferred embodiment the surface-modified silica is then contacted with a magnesium-containing compound or a magnesium aluminum complex. Suitable magnesium compounds that are contemplated for use in the present invention include hydrocarbyloxymagnesium halides having the formula ROMgX, where R=$C_1$ to $C_{12}$ hydrocarbyl and X is a halogen; dihydrocarbyl magnesium; alkylmagnesium halides and mixtures thereof. Preferably, the magnesium compounds are magnesium alkoxides, alkoxymagnesium halides and mixtures thereof. Especially preferred magnesium compounds, contemplated for use in the preparation of the catalyst of the present invention include 2-methylpentyloxymagnesium chloride, pentyloxymagnesium chloride, 2-ethylhexyloxymagnesium chloride, di-2-ethylhexyloxymagnesium and mixtures thereof. Of these, 2-ethylhexyloxymagnesium chloride and 2-methylpentyloxymagnesium chloride are particularly preferred. Other preferred materials are benzyloxymagnesium chloride and phenethyloxymagnesium chloride.

The concentration of hydrocarbon soluble magnesium-containing compound is from about 0.1 to about 10 mmol per 1 g of silica. More preferably, the concentration is from about 0.5 to about 5 mmol per g $SiO^2$.

The magnesium aluminum complexes employed by the present invention are characterized as having the structural formula (MgRR')$_m$(AlR''$_3$)$_n$ where R, R' and R'' are the same or different alkyl group and the ratio of m/n is from about 0.5 to about 10 inclusive. It is preferred embodiment that the ratio of m/n be between about 2 and 10.

The alkyl group R, R' and R'' are the same or different, and each has from about 2 to about 12 carbon atoms. When the R groups are identical, it is preferred that each has about 4 carbon atoms. Suitable R groups which meet this requirement are preferably butyl or hexyl groups. The alkyl groups R' are preferably ethyl groups.

The concentration of the magnesium-aluminum complex is from about 0.1 to about 10 mmole per g of $SiO_2$. More preferably, the concentration of the magnesium-aluminum complex is from about 0.3 to about 2.0 mmole per g of $SiO_2$.

The magnesium-aluminum complex is known in the art, as disclosed in Aishima et al. U.S. Pat. No. 4,004,071 (Jan. 18, 1977) at col. 2, 11. 34–40 and col. 3, 11. 30–36. The complex is readily prepared according to the teachings of Ziegler et al., Organometallic Compounds XXII: Organomagnesium-Aluminum Complex Compounds, Annalen der Chemie, Vol. 605. pages 93–97 (1957).

The reaction mixture containing the magnesium-aluminum complex and silica is then treated with about 0.1 to about 10 mmole of an alcohol per gram of silica. More preferably the concentration of alcohol per gram of silica is from about 0.1 to about 10 mmole.

The contacting step between the silica and the soluble magnesium compound usually occurs at a temperature in the range of about 15° C. and about 120° C. More preferably, this contact occurs at a temperature in the range of between about 50° C. and 110° C. The contact occurs over a period of between about 30 minutes and about 4 hours. Preferably, the contact occurs over a period of between about 1 hour and about 3 hours.

In a preferred embodiment, the reaction product of the magnesium component and silica component is then dried under precisely defined conditions until most of the solvent is removed. The drying process utilized by the present invention has been previously described in copending and coassigned patent application U.S. Ser. No. 854,199 filed Mar. 20, 1992, the contents of which are incorporated herein by reference. This drying process results in effective wetting of the surface of said compound such that a regular essentially continuous distribution of accessible magnesium values is present on the support material for further reaction. The process provides a surface coverage of magnesium values of about 1 to about 3 layers.

In addition to the silica being contacted by at least one hydrocarbon soluble magnesium-containing compound, the silica containing the magnesium compound may also contact a modifying compound selected from the group consisting of silicon halides, having the structural formula $SIX^4{}_4$, boron halides having the structural formula $BX^5{}_3$, aluminum halides having the structural formula $AlX^6{}_3$, where $X^4$, $X^5$, and $X^6$ are the same or different and are halogen, and mixtures thereof. Preferably, $X^4$, $X^5$, and $X^6$ are the same or different and are chlorine, fluorine or bromine. Thus, it is preferred that the modifying compound be silicon tetrachloride, silicon tetrabromide, boron trichloride, boron tribromide, aluminum trichloride, aluminum tribromide, or mixtures thereof. It is more preferred that $X^4$, $X^5$, and $X^6$ be chlorine. Thus, it is more preferred that the modifying compound be silicon tetrachloride, boron trichloride, aluminum trichloride, or mixtures thereof. Of these, silicon tetrachloride is most preferred.

The concentration of the modifying compound preferably utilized in the formation of the catalyst is from 0.1 to about 10 mmole/g $SiO_2$. More preferably, the concentration of modifying compound to 1 g of silica is 0.5 to 5.0 mmol. The contact between the modifying compound and the silica supported magnesium-containing compound occurs at a temperature from about 0° C. to about 100° C. over a time period of about 30 minutes and about 2 hours. More preferably, this contacting step occurs over a time period of about 45 minutes to about 1½ hours at a temperature of about 50° C. to 75° C.

It is noted that although the contact between the modifying component and the hydrocarbon soluble magnesium compound are discussed in the order described hereinabove, the sequence of silica treatment involving these two catalyst compounds is independent. In other words, silica may be in contact with the modifier prior to its contact with the magnesium compound.

In another preferred embodiment, the solid product obtained so far may be washed several times with an appropriate organic solvent to remove any reagents that are not substantially adsorbed onto the support material. It is preferred that the solvent be a hydrocarbon, either aliphatic or aromatic. Of these hydrocarbons, alkanes containing 5 to 15 carbon atoms, like pentane, hexane, cyclohexane, heptane, decane, etc., are more preferred.

In the washing step, the product is immersed in the solvent with stirring at ambient temperature. After which the stirring is stopped and the mixture is allowed to settle. The solvent is thereafter removed from the solid product by decantating, siphoning or the like. This washing procedure may be repeated up to two to four times.

It is also recognized to one skilled in the art that prior to use, the solvent should be purified, e.g., by percolation through silica gel and/or molecular sieves, to remove traces of water, oxygen, polar compounds, and other materials capable of adversely affecting the catalyst activity.

Furthermore, all of the contacting steps described herein are carried out under an inert atmosphere, such as nitrogen or argon thus preventing any air or moisture to come into contact with the solid catalyst component.

The solid product obtained above is then contacted with at least one titanium-containing component. The titanium-containing compound used in the process of the invention is defined as having the structural formula $TiX^1_p(OR^1)_q$ wherein $X^1$ is halogen, $R^1$ is aryl, alkyl, aralkyl, cycloalkyl or alkylsilyl; p and q range from 0 to 4 with the proviso that the sum of p and q is 3 or 4. Mixtures of two or more of the hereinabove identified titanium-containing compound may also be used for preparing the solid catalyst component.

More preferably, the titanium compound is characterized as p being an integer from 2–4 and q is an integer from 0–2. Suitable titanium-containing compounds within the scope of this particular embodiment are titanium tetrachloride, titanium tetrabromide, methoxytitanium trichloride, ethoxytitanium trichloride, diethoxytitanium dichloride and the like.

Still more preferably, the titanium-containing compound is defined by p being an integer of 4 and q being 0. That is, the titanium compound is titanium tetrachloride or titanium tetrabromide. Of the two, titanium tetrachloride is particularly preferred for use as the titanium-containing compound.

The reaction between the solid component and the titanium-containing compound occurs at a temperature from about 0° C. to about 150° C. More preferably, the temperature of this contacting step is in the temperature range from about 50° C. to about 120° C. More preferably, the temperature is from about 80° C. to about 100° C.

The time employed for contacting the solid product with the second-titanium containing component is from about 0.1 hrs to about 5.0 hrs. More preferably, the contacting step occurs over a time period of about 0.2 hrs to about 3.0 hrs. Most preferably the time duration of this contacting step is between 0.5 hrs to about 1.5 hrs.

The solid catalyst component involving the above mentioned contacting steps may then be optionally washed by the same process defined hereinabove.

It should be appreciated that all the treatment steps in the formation of the catalyst of this invention, the contact of silica with the hydrocarbon soluble magnesium compound or the magnesium aluminum complex, the modifying compound and the titanium-containing compounds, involve contact between a solid, silica, and a liquid. This is because each of the compounds that are contacted with silica are liquids or a soluble compound in an inert hydrocarbon solvent under the conditions employed by the present process. As such, no ball-milling or other solid mixing is required. This expensive and difficult operation, usual in the formation of polymerization catalysts of the prior art, it thus eliminated. Those skilled in the art are aware, in the case where a hydrocarbon solvent is employed, that the solvent may be allowed to remain with the reaction mass or can be removed by decantation, filtration, evaporation, or the like.

Further observations regarding the above catalyst formation steps include the facts that the morphology of the polymer produced from this catalyst emulates the support; that the absence of any halogen in the support aids in keeping the halogen content of the polymer produced therefrom low; that the relatively low concentrations of titanium and magnesium on the silica support also tends to keep magnesium and titanium concentration in the polymer at similarly low levels; that the preparation of the catalyst of the present invention is conducted at moderate temperature, preferably, in the range of between about 0° C. and 100° C.; it is possible to use one or more of the electron donors, if desired.

The solid catalyst component produced herein is then contacted under polymerization reaction conditions with a first cocatalyst component and a second cocatalyst component.

The first cocatalyst of the catalyst system is an aluminum-containing compound. The aluminum-containing compound is preferably an alkylaluminum-containing compound. Alkylaluminum-containing compounds suitable for the present process include trialkylaluminum, alkylaluminum halides, alkylaluminum hydrides or mixtures thereof. More preferably, the cocatalyst is a trialkylaluminum. Of the trialkylaluminums, triethylaluminum, triisobutylaluminum and tri-n-propylaluminum are particularly preferred.

The second cocatalyst of the catalyst system is preferably at least one halosilane compound having the structural formula $R_a^2SiX_b^b$ wherein $X^2$ is a halogen, $R^2$ is hydrogen, alkoxy, aryloxy, alkyl, aryl, cycloalkyl; a is an integer from 0 to 3; and b is an integer from 1 to 4 with the proviso that a and b is 4. It should be noted that other Group IVB elements of the Periodic Table of Elements, excluding carbon, are contemplated herein as a substitute for silicon.

Of the halosilanes contemplated by the present invention, trichlorosilane, silicon tetrachloride, and trimethylchlorosilane are most preferred.

The molar ratio of the halosilane compound to the aluminum-containing cocatalyst is from 0.01 to about 100. More preferably, the concentration ratio of halosilane compound to first cocatalyst component is from about 0.1 to about 10. Based on solid catalyst component, the molar ratio of aluminum cocatalyst:halosilane cocatalyst:solid catalyst is from about 1:0.1:1 to about 1000:1000:1. More preferably, the molar ratio is defined from about 10:10:1 to about 300:300:1.

Our invention may also be utilized in conjunction with the practice of copending and coassigned application Ser. No. 010,949, filed Jan. 29, 1993 concurrently filed of the same inventive entity and incorporated herein by reference. That is the invention can be used alone as described herein or in conjunction with isobutylisopropyldimethoxysilane (IBIP) and an aluminum containing compound. In addition, the companion application discloses the use of a halosilane as part of the catalyst system.

In still another aspect of the present invention a process for polymerizing an olefin is set forth. This process comprises polymerizing at least one olefin under olefin polymerization conditions in the presence of the catalyst system of the present invention. That is, in the presence of the solid catalyst, the first cocatalyst and the second cocatalyst of the instant invention.

Olefins suitable in this process include α-olefins containing from two to twelve carbon atoms such as ethylene, propylene, butene, pentene, and the like.

In a particularly preferred embodiment of the present invention, the olefin polymerized is ethylene.

In this preferred embodiment, polymerization of ethylene occurs at a temperature in the range of between about 40° C. and 250° C. More preferably, the temperature of this reaction is in the range of about 50° C. and about 150+ C. The pressure of the ethylene polymerization reaction is in the range of between about 50 psig and about 1000 psig, more preferably between about 100 psig and about 700 psig. In a preferred embodiment the ethylene polymerization occurs in the presence of hydrogen gas.

The resultant polymeric product obtained from the present process exhibits an unexpected improvement in the polymer melt index compared with prior art polymers due to the presence of the halosilane cocatalyst. Those skilled in the art are aware that ethylene polymerization are adversely affected in catalyst activity where higher melt index resins are synthesized. Thus, maintaining catalyst activity while increasing the polymer melt index is considered a significant improvement in catalyst performance. By employing the present catalyst system, it is possible to obtain an improved polymer product while maintaining comparable catalyst activity of prior art systems.

The following examples are given to illustrate the scope of this invention. Because these examples are given for illustrative purposes only, the invention embodied therein should not be limited thereto.

EXAMPLE 1

Preparation of Solid Catalyst Component

Into a 250 ml, four-necked round bottom flask, purged with nitrogen gas free of oxygen and water, was placed 5 g of silica (Davison 94a) which has been previously treated with about 20 wt % of hexamethyl disilazane, and dried under a nitrogen purge (200 ml/min) at 150° C. for 60 min. The silica utilized in this example was characterized by standard B.E.T. method as having a surface area of 200 m²/g, a median particle size of 50 microns, and a pore volume of 1.3 cc/g.

The pretreated silica was then impregnated with 5 mmol of 2-methylpentyloxymagnesium chloride in a solution of purified heptane. The contents of the flask was thereupon heated to 60° C. under a purge of nitrogen (150 ml/min) and was maintained at this temperature for 30 minutes. Continuous stirring was conducted throughout the impregnating process. The temperature was then raised to 80° C. and maintained at this temperature, with continuous stirring under a nitrogen purge for 30 minutes. Thereafter, the temperature of the reaction vessel was raised to 95° C. and maintained at this temperature for about 30 min. During this time period most of the heptane solvent was removed. The reaction vessel was then cooled to ambient temperature and the resultant white solid product was a free flowing powder.

To this reaction product, 6 mmol of silicon tetrachloride in 20 ml of heptane was added. The contents of the reaction flask were heated to 60° C. for a period of about 0.5 hrs. At the end of this time period stirring and heating was discontinued, and 75 ml of heptane was added to the mixture.

The solid product of this contacting was allowed to settle and the supernatant liquid was siphoned off. The solid was washed three times in heptane. In each washing cycle 75 ml heptane was added to the solid with stirring. After a few minutes, stirring was discontinued and the solid product was allowed to settle. After which, the heptane solvent was siphoned off.

To the thus washed solid product was added 0.1 mmol of titanium tetracresylate in a heptane solution (5 ml) was added.

The titanium tetracresylate solution was added at ambient temperature. After which, titanium tetrachloride (3 mmol) in 15 ml of heptane was introduced into the flask. This addition again occurred at ambient temperature. The flask and its contents were then heated, at a temperature between 80° C. and 95° C. for 1 hr. At the conclusion of this period the solid product was dried under a $N_2$ purge (200 ml/min).

The solid product resulting from the above procedure was a bright yellow, free-flowing, spherically-shaped solid catalyst component. It was determined by analysis that the solid catalyst component comprised 1.5% Ti and 1.3% Mg, said percentages being by weight, based on total weight of the solid catalyst.

Polymerization of Ethylene

The solid catalyst component obtained above was then utilized in the polymerization of ethylene. That is, a 2-1 Autoclave Engineers (Trademark) reactor was charged with 185 mg of solid catalyst component. In addition, triethylaluminum (TEAL) and trichlorosilane (TCS) cocatalysts were included in concentrations such that the molar ratio of TEAL:TCS:Ti was 33:5:1. The ethylene polymerization reaction was conducted at a total pressure of 550 psig at 93° C. in 1.0 L of isobutane slurry. A pressure drop of 150 psig of $H_2$ from a 150 ml vessel was added. Ethylene was fed on demand for 1 hr. with stirring.

Polyethylene obtained from this polymerization reaction was weighed and analyzed. The results of the polymerization reaction are summarized in Table I.

Comparative Example 1, (CE1)

The solid catalyst component was prepared in accordance with Example I; however, during ethylene polymerization only triethylaluminum was used as a cocatalyst component while the use of a halosilane compound was omitted. The results of the polymerization reaction are summarized in Table I.

Comparing the result of this comparative example with Example 1 indicates the significance of the present invention. For example, an increase of 18.3% in catalytic activity is achieved when the cocatalysts component contains both TEAL and TCS. The presence of both cocatalyst components results in significant enhancement in the melt index (MI) from 0.602 to 1.14 and high load melt index (HLMI) from 17.3 to 33.4 of the resultant polymeric product.

EXAMPLE 2

Preparation of Solid Catalyst Component

The solid catalyst component was prepared in a similar manner to Example 1 except that the titanium ester was omitted.

The solid product resulting from the above procedure was a pale yellow, free-flowing, spherically-shaped solid catalyst component. It was determined by analysis that the solid catalyst component comprised 1.9% Ti and 1.5% Mg, said percentages being by weight, based on total weight of the solid catalyst.

Polymerization of Ethylene

The polymerization of ethylene was conducted in accordance with the procedure described in Example 1 except that the amount of catalyst charged into the reactor was 97 mg. In addition to the decrease in the solid catalyst component, the halosilane cocatalyst component used in this example was silicon tetrachloride instead of trichlorosilane. The molar ratio of TEAL:SiCl$_4$:Ti was 41:13:1. The results of the polymerization reaction are summarized in Table I.

Comparative Example 2, (CE2)

The solid catalyst component and the polymerization of ethylene using the catalysts was conducted in accordance with Example 2; however, no halosilane compound was used as a cocatalyst. The results of this process are summarized in Table I.

It is apparent from the data in Table I that the presence of dual cocatalysts, i.e., aluminum-containing and halosilane compounds, results in improved melt index of the polymeric product, while maintaining comparable catalyst activity.

EXAMPLE 3

Preparation of Solid Catalyst Component

The solid catalyst component was prepared in accordance to Example 4 of U.S. Pat. No. 4,950,631.

Polymerization of Ethylene

The polymerization reaction was conducted in accordance to Example 2 except that molar ratio of TEA:SiCl$_4$:Ti was 37:6:1. The results of the polymerization reaction are also summarized in Table I.

Comparative Example 3, (CE3)

The solid catalyst component and the polymerization reaction were conducted in accordance with Example 3; however, during polymerization only TEAL was used as a cocatalyst component.

The result of this experiment are summarized in Table I. The results indicate once again that higher catalytic activity and improved polymeric characteristics can be achieved when the cocatalysts components are an alkylaluminum compound and a halosilane compound. In this particular instance, a 1.6% improvement in the catalyst activity is obtained when employing the cocatalyst of the invention. And more significantly, the melt index of the polisher was increased from 0.4 to 2.0, while maintaining high catalyst activity.

EXAMPLE 4

Preparation of Solid Catalyst Component Using a Magnesium-Aluminum Complex

The solid catalyst component was prepared in accordance to the procedure described in Example 5 of U.S. Pat. No. 4,530,913.

Polymerization of Ethylene

The solid catalyst component obtained above was then utilized in the polymerization of ethylene. That is, a 1 gallon Autoclave Engineers (Trademark) reactor was charged with 218 mg of solid catalyst component. In addition, triethylaluminum (TEAL) and trimethylchlorosilane (TMECS) cocatalysts were included in concentrations such that the molar ratio of TEAL:TMECS:Ti was 15:15:1. The ethylene polymerization reaction was conducted at a total pressure of 550 psig at 93° C. in 1.5 L of isobutane slurry. A pressure drop of 100 psig of H$_2$ from a 1000 ml vessel was added. Ethylene was fed on demand for 1 hr. with stirring.

Polyethylene obtained from this polymerization reaction was weighed and analyzed. The results of the polymerization reaction are summarized in Table I.

Comparative Example 4, (CE4)

The solid catalyst component was prepared in accordance with Example 4, except that during the polymerization of ethylene no halosilane compound was used as a cocatalyst. The results of the polymerization reaction are summarized in Table I.

Comparing the result of this comparative example with Example 4 indicates the significance of the presence of a halosilane cocatalyst. For example, an increase of 42% in catalytic activity is achieved when the cocatalysts component contains both TEAL and TMECS.

The above embodiments and examples are given to illustrate the scope and spirit of the present invention. These embodiments and examples will make apparent, to those skilled in the art, other embodiments and examples. These other embodiments and examples are within the contemplation of the present invention; therefore, the instant invention should be limited only by the appended claims.

TABLE I

POLYMERIZATION OF ETHYLENE WITH CHLOROSILANE CO-CATALYST SYSTEM

| Examples | Charge (mg) | [TEA] (mmol/L) | [SILN] (mmol/L) | YLD (g) | ACT. (g/gh) | MI | HLMI |
|---|---|---|---|---|---|---|---|
| CE1 | 180 | 1.92 | none | 78.7 | 438 | .602 | 17.3 |
| 1 | 185 | 1.92 | 0.28 TCS | 95.7 | 518 | 1.14 | 33.4 |
| CE2 | 101 | 1.60 | none | 98.8 | 978 | 0.82 | 31.4 |
| 2 | 97 | 1.60 | 0.5 SiCl4 | 110 | 969 | 1.64 | 54.7 |
| CE3 | 98 | 2.40 | none | 137 | 1398 | .41 | 13.5 |
| 3 | 104 | 2.40 | .35 SiCl4 | 148 | 1420 | 2.0 | 59.4 |
| CE4 | 153 | 1.20 | none | 64.7 | 423 | .39 | 12.0 |

TABLE I-continued

POLYMERIZATION OF ETHYLENE WITH CHLOROSILANE CO-CATALYST SYSTEM

| Examples | Charge (mg) | [TEA] (mmol/L) | [SILN] (mmol/L) | YLD (g) | ACT. (g/gh) | MI | HLMI |
|---|---|---|---|---|---|---|---|
| 4 | 218 | 1.20 | 1.2 TMeCS | 131 | 601 | .41 | 12.3 |

TCS = trichlorosilane
SiCl4 = silicon tetrachloride
TMeCS = trimethylchlorosilane
All polymerizations except those in 4 and CE4 were done in 1.0 L isobutane slurry at 200° F. and 550 psig total pressure. A pressure drop of 150 psig of H2 from a 150 mL vessel was added. Ethylene was fed on demand for 60 minute runs, unless otherwise noted.
Example 4 and CE4 were conducted in a 10 Gallon reactor in 1.5 L isobutane slurry at 93° C. and 550 psig total pressure. A pressure drop of 100 psig H₂ from a 1000 ml vessel was added.

What is claimed is:

1. In a catalyst system for (co)polymerizing at least one α-olefin under olefin polymerization conditions consisting essentially of:
   (i) a supported magnesium/titanium-containing solid catalyst component prepared by the steps of:
      (a) pretreating a silica support to remove surface hydroxyl groups;
      (b) contacting said pretreated silica support with a hydrocarbon soluble magnesium-containing compound selected from the group consisting of hydrocarbyloxy magnesium halides having the formula ROMgX where R is a $C_1$ to $C_{12}$ hydrocarbyl, and X is a halogen; dihydrocarbyl magnesium; alkylmagnesium halides, magnesium aluminum complexes having the formula $(MgRR')_m (AlR_3'')_n$ where R, R', R" are the same or different and are alkyl groups and the ratio of m/n is from about 0.5 to about 10, and mixtures thereof;
      (c) optionally, drying the contacted product of step (b) to form a solid product;
      (d) optionally, contacting said solid product of step (c) with at least one modifying compound selected from the group consisting of silicon halides, boron halides, aluminum halides, alkyl silicon halides, and mixtures thereof; and
      (e) contacting said product of step (b) or (d) with at least one titanium-containing compound having the formula $TiX_p(OR')_q$ wherein R' is aryl, alkyl, cycloalkyl, aralkyl, alkylsilyl or mixtures thereof; X is halogen; p and q range from 0 to 4, with the proviso that the sum of p and q is 3 or 4;
   the improvement comprising an alkylaluminum first cocatalyst component, and at least one halosilane second cocatalyst component having the formula $R_a^2SiX_b^2$ wherein $X^2$ is halogen, $R^2$ is hydrogen, alkoxy, aryloxy, silyloxy, alkyl, aryl or cycloalkyl; a is 0 or an integer from 1 to 3; and b is an integer from 1 to 4, with the proviso that the sum of a and b is 4.

2. The catalyst system of claim 1 wherein the halosilane component is selected from the group consisting of trimethylchlorosilane, silicon tetrachloride and trichlorosilane.

3. The catalyst system of claim 1 wherein the alkylaluminum cocatalyst component is selected from the group consisting of trialkylaluminum, alkylaluminum halide, alkylaluminum hydride and mixtures thereof.

4. The catalyst system of claim 3 wherein the alkylaluminum cocatalyst component is triethylaluminum.

5. The catalyst system of claim 3 wherein the alkylaluminum cocatalyst component is triisobutylaluminum.

6. The catalyst system of claim 1 wherein the alkylaluminum cocatalyst component and the halosilane cocatalyst component are added to the solid catalyst component in a molar ratio of about 1:0.1:1 to about 1000:1000:1 based on aluminum:halosilane:titanium.

7. The catalyst system of claim 1 wherein the α-olefin contains from about 2 to about 12 carbon units.

8. The catalyst system of claim 1 wherein the α-olefin is ethylene.

9. The catalyst system of claim 8 wherein the polymerization of said ethylene is carried out at a temperature from about 40° to about 250° C.

10. The catalyst system of claim 1 wherein said hydrocarbon soluble magnesium compound is 2-methylpentyloxymagnesium chloride.

* * * * *